June 30, 1925.  
B. KELLERMANN  
1,544,322  
METHOD OF HEADING LETTUCE  
Filed Sept. 29, 1924

Inventor  
Bessie Kellermann.  
By A. J. O'Brien  
Attorney

Patented June 30, 1925.

1,544,322

UNITED STATES PATENT OFFICE.

BESSIE KELLERMANN, OF DENVER, COLORADO.

METHOD OF HEADING LETTUCE.

Application filed September 29, 1924. Serial No. 740,606.

*To all whom it may concern:*

Be it known that I, BESSIE KELLERMANN, a citizen of the United States, residing at the city and county of Denver and State of Colorado, have invented certain new and useful Improvements in Methods of Heading Lettuce; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvement in the method for growing lettuce with firm, solid heads.

In many parts of our country one of the most valuable crops raised is head lettuce. One of the most desirable qualities of head lettuce is firmness, a solid head being worth more on the market than a loose, bulky one. I have found that in order to produce the choicest heads of lettuce, it is necessary to confine the heads so that the leaves will be held together and prevented from spreading. When the heads are confined by a device formed of reticulated material, before they are fully grown, they will become firm and solid and will also become bleached to some extent. This will tend to make them more valuable.

In order to make it possible to inclose a large number of heads without an excessive amount of labor, I have invented a device that I designate a lettuce header. This device comprises two hollow members of reticulated materials which, when in closed position, form a substantially spherical, or perhaps more nearly a pear-shaped, hollow body which can be applied to the head and locked in place thereon.

Figure 1:
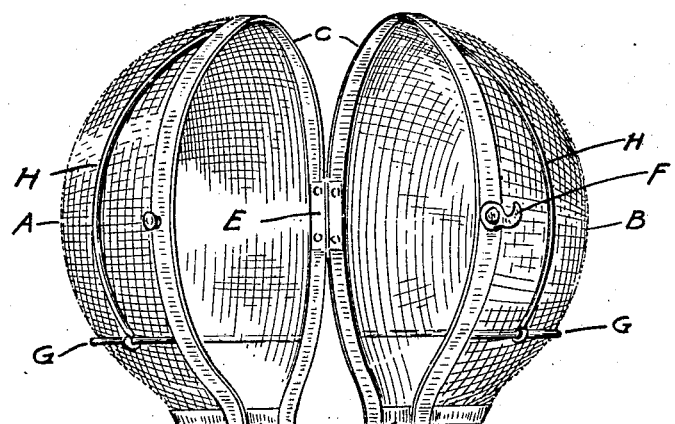

My invention can be most clearly described and will be most readily understood when reference is had to the accompanying drawing in which the same is illustrated, and in which Fig. 1 is a perspective view showing my header in open position.

Figure 2:
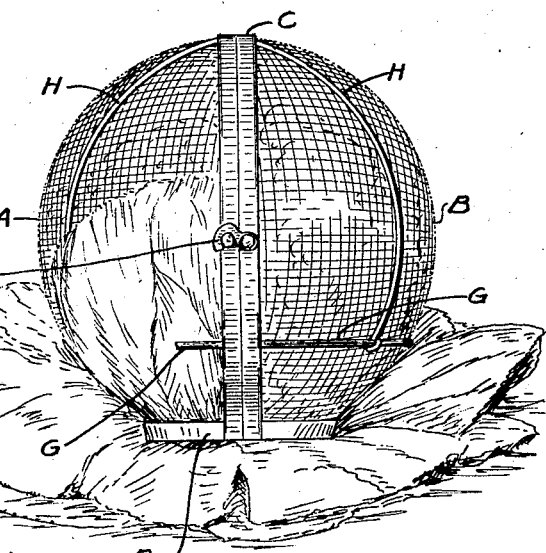
Figure 3:
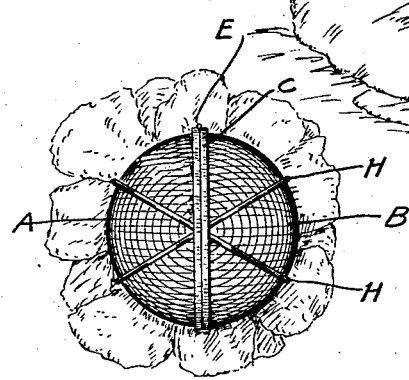

Fig. 2 is a view of a lettuce plant showing my header in place thereon, a portion of the material of the header being broken away, and Fig. 3 is a plan view of a lettuce plant with my device thereon.

My header consists of two substantially identical members A and B formed from wire netting of a mesh somewhat like that employed for window screens. The wire should preferably be galvanized so as to resist the corroding effects of the elements. By means of suitable dies, the screen or netting is formed into the desired shape. The edges are then attached to a suitable binding strip C. In order to permit the header to be properly applied to the head, I form the parts, so that when they are in closed position, there will be a circular opening at the bottom for the reception of the neck of the plant. The material about the opening is secured to a suitable binder D. A suitable hinge E connects the two parts in the manner shown in Fig. 1. On the side opposite from the hinge, I provide a hook F or other suitable means for holding the members A and B in closed position. In some instances, it may be desirable to further reinforce the parts and for this purpose I provide a wire band G which extends parallel with the binding strip D. Other wires H connect the wires G with a point near the upper portion of the device.

When the head has formed, but before it is fully grown, the header, just described, is put in place about the same and left there until the head is fully grown. As the growth of a lettuce head is from the inside, it will gradually fill the header and become somewhat compressed. This pressure will form a solid firm head, and the fact that the leaves are held from spreading causes them to bleach so that they will be much whiter than they otherwise would have been.

From the above, it will be apparent that I have invented a new method of treating head lettuce so as to obtain firmer and better lettuce, and that I have also produced a device by means of which my method may be carried out.

Having now described my invention, what I claim as new is:

1. The method of treating growing head lettuce which consists in enclosing the same by reticulated material before the head is fully grown and retaining it enclosed until the lettuce is harvested whereby the head is caused to become firm and bleached.

2. The method of treating head lettuce so as to obtain firm solid well bleached heads which consists in inclosing the head with a non-expansible reticulated closure at a time before the head is fully grown and leaving said enclosure in place until the head is matured whereby the head will be prevented from spreading out and whereby a firm solid head will be produced.

In testimony whereof I affix my signature.

BESSIE KELLERMANN.